United States Patent [19]

Matsuda et al.

[11] Patent Number: 5,197,787
[45] Date of Patent: Mar. 30, 1993

[54] PRESSURE SUPPLY SYSTEM HAVING MEANS FOR CONTROLLING AN OUTPUT PRESSURE THEREOF

[75] Inventors: Shohei Matsuda; Kazutoshi Tashima; Kohichi Furuya; Masaaki Myoi, all of Saitama, Japan

[73] Assignee: Honda Giken Kogyo Kabushiki Kaisha, Tokyo, Japan

[21] Appl. No.: 721,802

[22] Filed: Jun. 26, 1991

[30] Foreign Application Priority Data

Aug. 3, 1990 [JP] Japan .................... 2-206314

[51] Int. Cl.⁵ .................... B60T 8/32; B60T 17/02
[52] U.S. Cl. .................... 303/10; 60/413; 188/181 R; 303/11; 303/DIG. 4; 303/100; 303/116.4; 303/113.1; 417/38
[58] Field of Search .................... 303/10–12, 303/100, 116 R, 116 SP, 116 PC, 116 WP, 113 R, 94–95, 91, 114 R, 92, 114 PB, DIG. 3, DIG. 4; 188/181 A, 181 R; 180/197, 307, 308, 165; 417/36, 38, 282, 298; 60/413, 418

[56] References Cited

U.S. PATENT DOCUMENTS

| | | | |
|---|---|---|---|
| 1,805,629 | 5/1931 | McCune | 303/11 X |
| 2,947,579 | 8/1960 | Woodworth | 303/DIG. 4 X |
| 3,587,233 | 6/1971 | Fishbach | 60/418 X |
| 3,963,039 | 6/1976 | Coeurderoy | 60/413 X |
| 3,964,260 | 6/1976 | Williams et al. | 60/413 |
| 4,083,608 | 4/1978 | Shirey | 303/11 |
| 4,240,515 | 12/1980 | Kirkwood | 180/165 |
| 4,402,554 | 9/1983 | Belart | 303/116 R X |
| 4,428,620 | 1/1984 | Warwick et al. | 303/DIG. 3 X |
| 4,459,085 | 7/1984 | Tonegawa | 417/282 |
| 4,509,802 | 4/1985 | Solleder et al. | 180/197 X |
| 4,640,555 | 2/1987 | Bertling et al. | 303/11 X |
| 4,699,435 | 10/1987 | Wupper | 303/11 |
| 4,728,156 | 3/1988 | Burgdorf et al. | 303/DIG. 4 X |
| 4,756,669 | 7/1988 | Hata | 60/418 X |
| 4,880,282 | 11/1989 | Makino et al. | 303/92 X |

FOREIGN PATENT DOCUMENTS 2071783  9/1981  United Kingdom .................... 417/38

Primary Examiner—Douglas C. Butler
Attorney, Agent, or Firm—Nikaido, Marmelstein, Murray & Oram

[57] ABSTRACT

A pressure supply system for a vehicle according to the invention incorporates a pump and an accumulator in which an output pressure of the pump is maintained within a prescribed range by controlling the on-off operation of the pump according to the inner pressure of the accumulator. By changing the prescribed range of pressure according to the actual pressure requirement, for instance according to the change in the travelling speed of the vehicle, the burden on the system is reduced. The prescribed range can be changed either by simply changing the upper and/or lower pressure limits at which the pump is deactivated and activated, respectively, or by operating the pump for a prescribed time period which is dependent on the pressure requirement after a certain reference pressure value is reached. Thus, the structure of the fluid pressure system is simplified, and the generation of unnecessary high pressure can be avoided.

9 Claims, 4 Drawing Sheets

PRESSURE SUPPLY SYSTEM HAVING MEANS FOR CONTROLLING AN OUTPUT PRESSURE THEREOF

TECHNICAL FIELD

The present invention relates to a pressure supply system for supplying pressure to an actuator which is actuated by fluid pressure, and in particular to a fluid pressure supply system for a vehicle which can supply a proper pressure adapted to each particular operating condition of the vehicle.

BACKGROUND OF THE INVENTION

In a typical hydraulic control pressure supply system for hydraulic servo brakes and anti-lock brake systems (which are referred to as ALB systems hereinafter), a pressure storage device such as an accumulator is provided at an upstream end of an actuator, and the start and stop control of the pump is carried out according to the level of an inner pressure of the pressure storage device so that a stable actuation pressure may be supplied to the actuator at all times. More specifically, as indicated by the solid line in FIG. 4, the inner pressure of the pressure storage device is maintained within a prescribed range by starting the pump at a certain lower pressure limit which is determined according to the capacity of the actuator and stopping the pump at a certain upper pressure limit which is determined according to the capability of the hydraulic circuit to withstand pressure, the frequency of the operation of the pump and temperature changes.

The prescribed pressure levels serving as the basis for controlling the start and stop operation of the pump are generally fixed values which are based on the maximum capacity of the particular vehicle, Therefore, for instance, in the case of an ALB system, the braking force should be determined according to the travelling speed of the vehicle and is required to be higher as the vehicle speed is increased. But, in reality, the range of the pressure stored in the pressure storage device is fixed, and the pressure existing in the pressure storage device is simply given to the brake circuit without regards to the travelling speed of the vehicle.

In other words, according to the conventional fluid pressure supply system, since the range of the inner pressure of the accumulator is fixed according to the maximum braking force that is required under the severest possible condition, for instance at the time of travelling at high speed, the high pressure corresponding to the maximum capacity of the system is introduced to the brake circuit even when the vehicle is operating under a light condition, for instance at the time of travelling at low speed. Therefore, an excessively high pressure level which is higher than necessary must be finely controlled at the actuator, and the burden of actuator control increases. Furthermore, the fatigue strength must be ensured based on the constant application of the high pressure, and the brake circuit is required to be provided with an excessively high durability.

As an additional factor, since the temperature of the engine room in which the hydraulic pump is located is higher when the vehicle speed is low for a given surrounding temperature, the viscosity of the oil drops when the vehicle speed is low and the oil temperature is high, and the output efficiency of the pump tends to drop. Therefore, the capacity of the pump must be selected to be higher than normally required because the pump is required to produce a high pressure according to the upper limit level determined by a pressure switch even when the vehicle is travelling at low speed.

BRIEF SUMMARY OF THE INVENTION

In view of such problems of the prior art, a primary object of the present invention is to provide an improved fluid pressure supply system which can reduce the unnecessary burden on the actuator by supplying necessary and sufficient fluid pressure thereto at all times.

A second object of the present invention is to provide an improved fluid pressure supply system which allows the design strength of the hydraulic circuit to be reduced without compromising its reliability.

A third object of the present invention is to provide an improved fluid pressure supply system which can reduce the burden on the pump by eliminating the need for unnecessary operation of the pump.

These and other objects of the present invention can be accomplished by providing a pressure supply system for on-board equipment of a vehicle, comprising: a pump actuated by power drive means; an output conduit connected to an output end of the pump; an accumulator connected to the conduit; a pressure sensor for detecting an inner pressure of the accumulator; sensor means for detecting a pressure requirement of the on-board equipment to which pressure is to be supplied; and a control unit for controlling operation of the pump according to an output of the sensor means so as to maintain the accumulator inner pressure as detected by the pressure sensor within a prescribed range, the range being changed depending on the pressure requirement as detected by the sensor means. The pressure requirement, for instance, may be evaluated according to the travelling speed of the vehicle.

According to such a structure, the stored pressure can be reduced in level when the vehicle is travelling at low speed or when the necessary pressure level is low. Therefore, it becomes possible to reduce the time period during which an unnecessarily high pressure is applied to the hydraulic circuit by supplying a pressure which is appropriately selected according to the travelling speed or other operating condition of the vehicle, so as to ease the requirement of the fatigue strength of the hydraulic circuit, and to reduce the necessary capacity of the pump.

Such a prescribed range of the accumulator inner pressure can be achieved when the control unit comprises memory means for defining an upper limit pressure value and a lower limit pressure value, the control unit activating the pump when the accumulator inner pressure detected by the pressure sensor has reached the lower limit pressure value and deactivating the pump when the accumulator inner pressure detected by the pressure sensor has reached the upper limit pressure value; at least one of the upper and lower limit pressure values being changed with a change in the vehicle speed as detected by the speed sensor.

Alternatively, the control unit may comprise means for controlling the pump so as to maintain the accumulator inner pressure above a certain minimum pressure and memory means for defining a reference pressure value, the control unit deactivating the pump after the elapsing of a certain time period following a time point when the accumulator inner pressure detected by the pressure sensor has reached the reference pressure value, the time period being changed with a change in the vehicle speed. In this case, the pressure sensor may be a simple pressure sensor which can only detect the pressure level crossing the reference value, and the system structure may be simplified.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following in terms of specific embodiments thereof with reference to the appended drawings.

Figure 1:
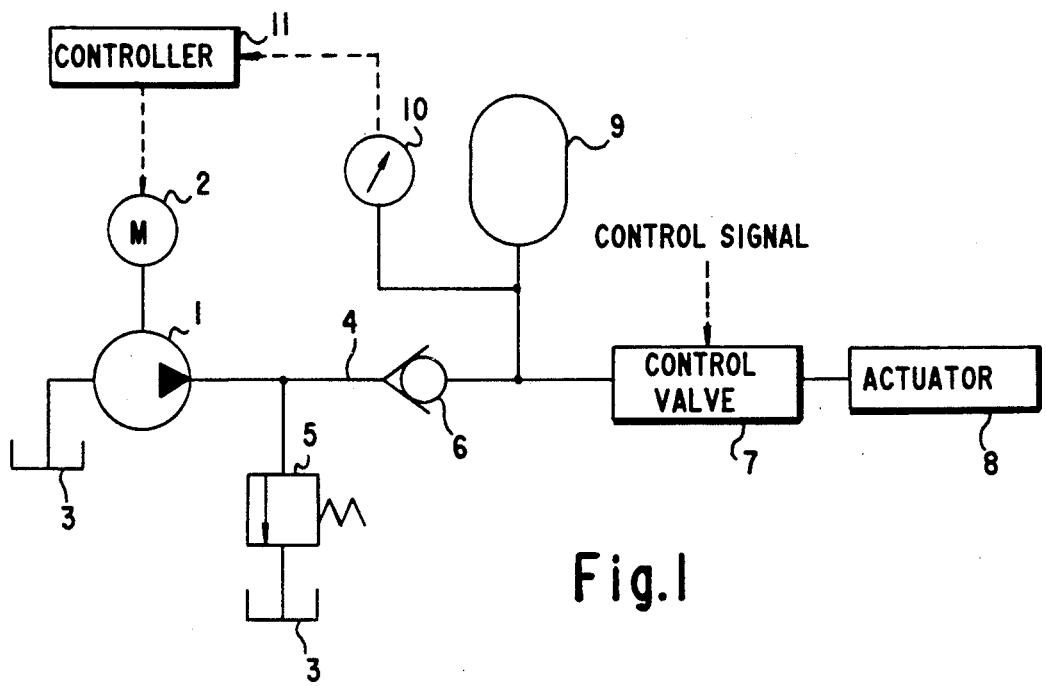
FIG. 1 is a schematic circuit diagram of an oil pressure supply system to which the present invention is applied.

FIG. 1 is an overall circuit diagram of a fluid pressure supply device for an ALB system or the like according to the present invention. A pump 1 which may consist of a plunger pump 1 is actuated by an electric motor 2, and draws oil from a reservoir tank 3, and feeds it to a supply conduit 4 as pressurized oil.

The supply conduit 4 is provided with a relief valve 5 for returning the oil back to the reservoir tank 3 when the line pressure is higher than a prescribed value, and a check valve 6 for preventing the reverse flow of the oil back to the pump 1. An actuator 8 which is controlled by a control valve 7 receives oil pressure which is stored in an accumulator 9, connected to the supply conduit 4 and having, for instance, a bladder filled with gas.

The accumulator 9 is provided with a pressure sensor 10 for detecting its inner pressure so that the condition of the stored pressure may be monitored at all times. The drive control of the electric motor 2 is carried out by a controller 11 according to a detected value supplied by the pressure sensor 10 to the controller 11.

Figure 2:
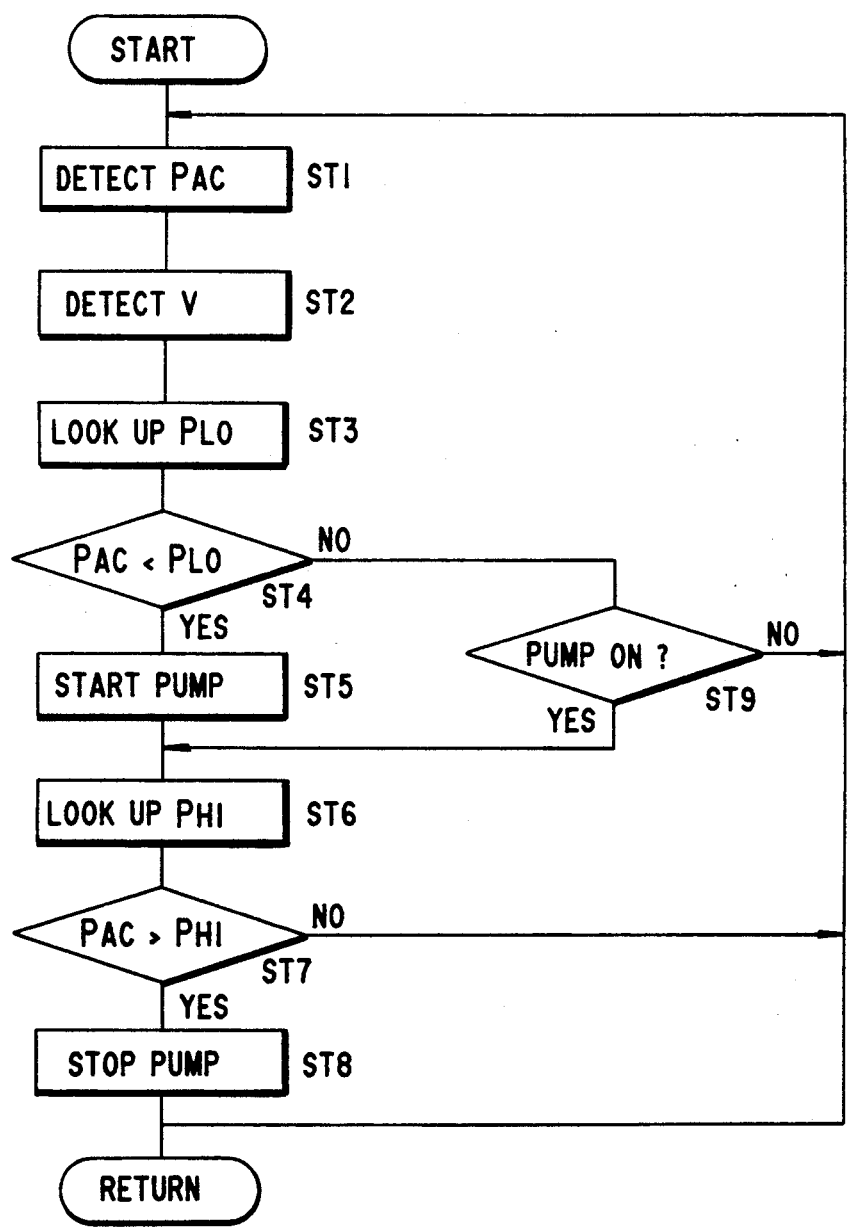
FIG. 2 is a flow chart of an example of the control process for the pressure supply system.
Figure 5:
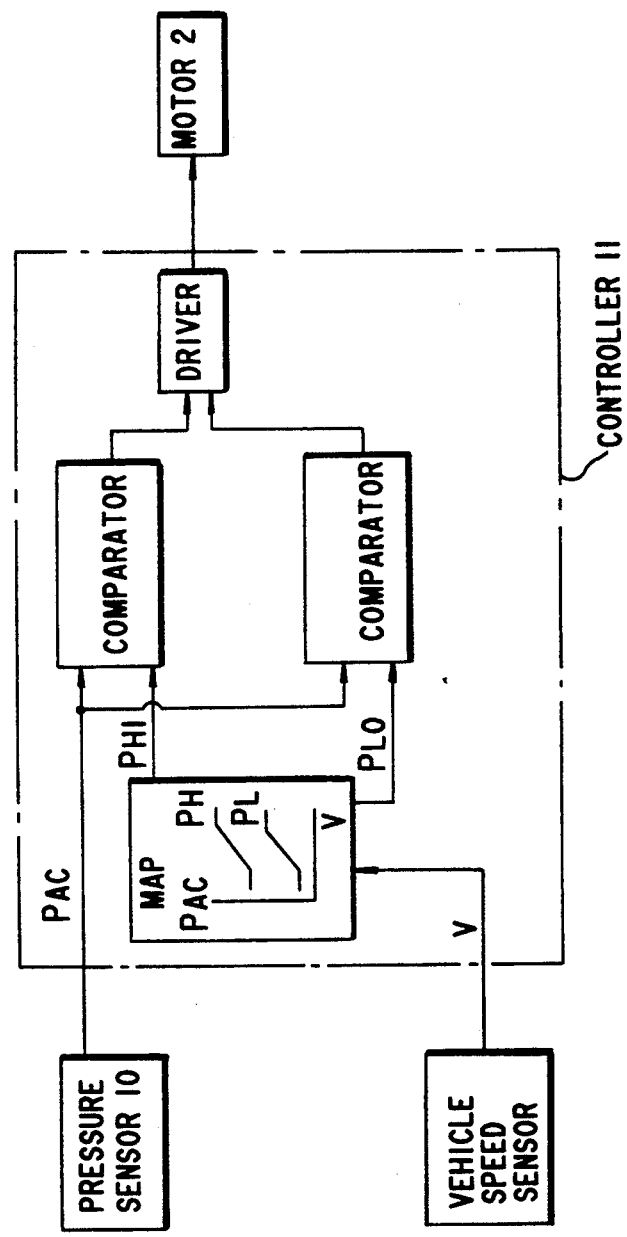
FIG. 5 is a block diagram illustrating the structure and operation of the control unit.

FIG. 2 is a flow chart of the control action for maintaining the inner pressure of the accumulator 9 within a certain prescribed range according to a signal from the pressure sensor 10. FIG. 5 illustrates the operation within the controller 11.

In step 1, the accumulator inner pressure $P_{AC}$ is detected, and, in step 2, the travelling speed of the vehicle V is detected. In step 3, a memory map of the lower limit PL of the accumulator inner pressure which is stored in the controller 11 for various travelling speeds is looked up, and the lower limit pressure value $P_{LO}$ for the travelling speed obtained in step 2 is determined.

In step 4, the accumulator inner pressure $P_{AC}$ detected in step 1 is compared with the lower limit pressure value $P_{LO}$ determined in step 3. If the accumulator inner pressure is determined to be lower than the lower limit pressure value ($P_{AC} < P_{LO}$), a start command is issued to the electric motor 2 which drives the pump in step 5.

Following the start up of the pump 1, in step 6, a memory map of the upper limit PH of the accumulator inner pressure $P_{HI}$ which is stored in the controller 11 for various travelling speeds is looked up, and the upper limit pressure value $P_{HI}$ corresponding to the travelling speed detected in step 2 is determined. Then, in step 7, the accumulator inner pressure $P_{AC}$ detected in step 1 is compared with the upper limit pressure value $P_{HI}$ determined in step 6. If the accumulator inner pressure is determined to be yet to reach the upper limit pressure value ($P_{AC} < P_{HI}$), the program flow returns to step 1. If the accumulator inner pressure is determined to be higher than the upper limit pressure value ($P_{AC} > P_{HI}$), a stop command is issued to the electric motor 2 in step 8.

In step 4, if the accumulator inner pressure is determined to be higher than the lower limit pressure value ($P_{AC} > P_{LO}$), it is determined if the pump 1 is in operation in step 9; the program flow skips step 5 and advances to step 6 if the pump 1 is in operation, but returns to step 1 if the pump 1 is not in operation.

Figure 4:
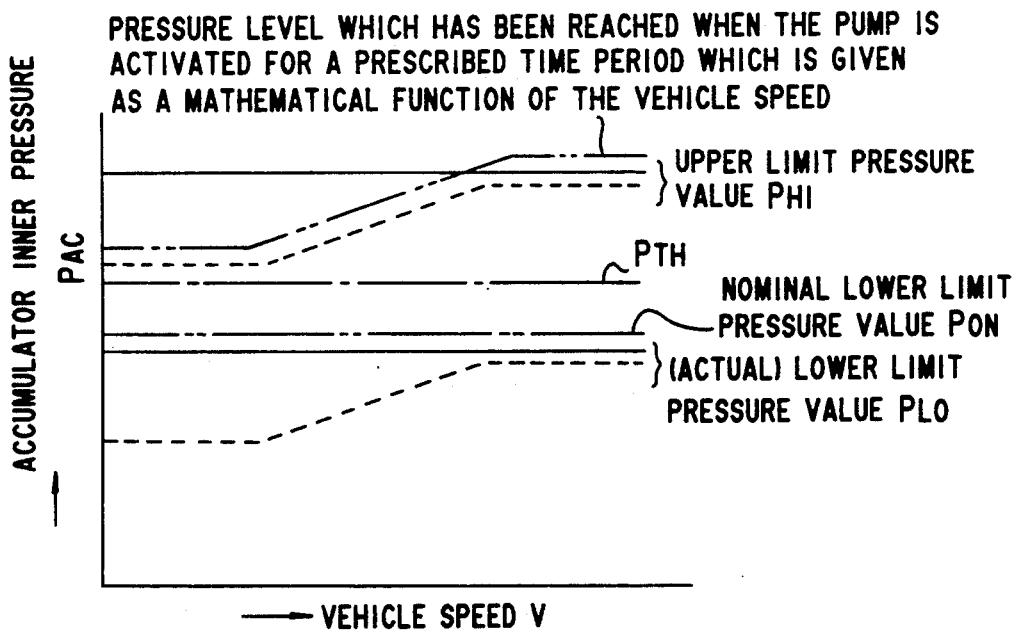
FIG. 4 is a graph showing the relationship between the accumulator inner pressure and the travelling speed of the vehicle.

In this control flow, the start and stop pressure levels for the pump 1 change with the travelling speed of the vehicle as indicated by the broken line in FIG. 4. In other words, the range of the accumulator inner pressure $P_{AC}$ changes with the travelling speed of the vehicle V. Normally, the working pressure of the actuator 8 is controlled in such a manner as to rise with the increase in the vehicle speed.

According to this embodiment, since the start and stop pressure levels are both changed with the vehicle speed, it is possible to freely determine the range of the working pressure, and obtain an ideal pressure setting.

Figure 3:
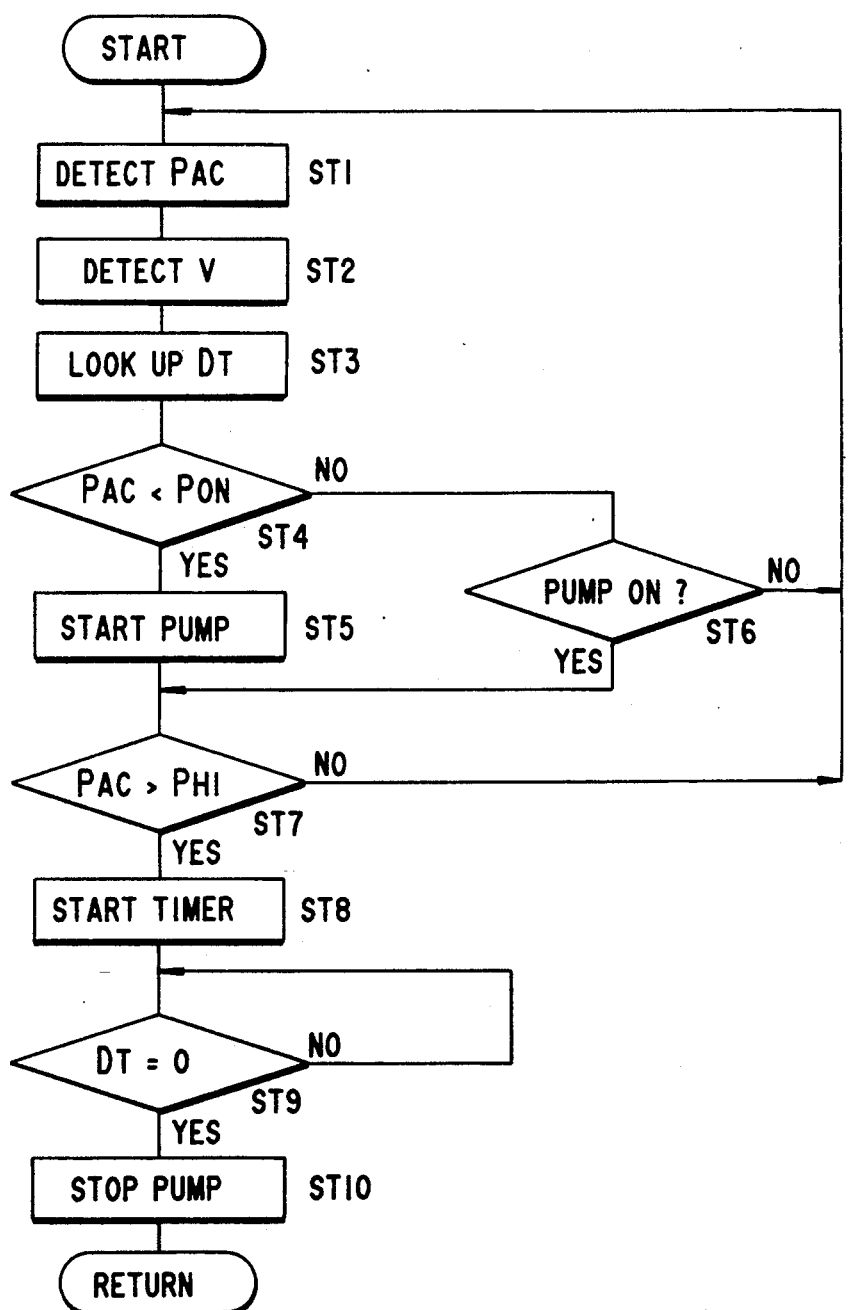
FIG. 3 is a flow chart of another example of the control process.

FIG. 3 shows another embodiment of the control flow according to the present invention.

First of all, in step 1, the accumulator inner pressure $P_{AC}$ is detected, and, in step 2, the travelling speed of the vehicle V is detected. In step 3, a map for determining the timing to stop the pump 1 for different vehicle speeds is looked up, and a time period $D_T$ corresponding to the current vehicle speed V is determined.

Then, in step 4, the accumulator inner pressure $P_{AC}$ is compared with a prescribed pump start-up pressure $P_{ON}$. If the accumulator inner pressure $P_{AC}$ is determined to be lower than the pump start-up pressure $P_{ON}$ ($P_{AC} < P_{ON}$), a start command is issued to the electric motor 2 which drives the pump in step 5. If the accumulator inner pressure is determined to be already higher than the pump start-up pressure $P_{ON}$ ($P_{AC} > P_{ON}$), it is determined if the pump 1 is in operation or not in step 6; the program flow returns to step 1 if the pump is not in operation, and skips step 5 and advances to step 7 if the pump 1 is in operation.

After starting up the pump 1, the accumulator inner pressure $P_{AC}$ is compared with a prescribed reference pressure $P_{TH}$. If the accumulator inner pressure is determined to be lower than the reference pressure ($P_{AC} < P_{TH}$), the program flow returns to step 1. If the accumulator inner pressure is determined to be higher than the reference pressure ($P_{AC} > P_{TH}$), the count of the time period $D_T$ set up in step 3 is started in step 8. When it is determined that the time is up in step 9, a motor stop command is issued to the electric motor 2 in step 10.

In this control process, the pump start-up pressure $P_{ON}$ (lower limit pressure level) is a fixed value, and the pressure (upper limit pressure level) is changed with the vehicle speed by changing the time period $D_T$ between the time when the reference pressure value $P_{TH}$ is reached and the time when the pump is actually stopped. In other words, according to the present embodiment, by making use of the fact that there is a certain correlation between the operation time period of the pump and the increase in the accumulator inner pressure, the reference pressure value $P_{TH}$ is determined according to the necessary pressure level in low speed condition, and the pressure stored in the accumulator is caused to be higher by operating the pump 1 for a comparatively longer time period in high speed condition.

Thus, the operation of the pump will be frequently interrupted in low speed condition because the difference between the upper limit pressure value and the lower limit pressure value is small, but the possibility of fatigue due to cyclic loading can be reduced since the upper limit pressure value is controlled to a low level in low speed condition.

The present invention can be applied not only to control hydraulic pressure in ALB and other brake systems but also to control the oil pressure for active suspension systems and the coupling force between right and left wheels in limited slip differential devices.

Thus, according to the present invention, since the output oil pressure in stationary and low speed conditions is controlled to be lower than that in high speed condition, a proper pressure is supplied to the actuator and it becomes possible to prevent the introduction of excessive pressure to the oil pressure circuit and the generation of excessive pressure from the pump as opposed to the case of the conventional oil pressure supply device in which the range of line pressure is fixed. Therefore, the burden on the actuator can be reduced, the load on the hydraulic circuit can be reduced, and the pump capacity may be reduced, with the result that the overall durability can be improved, and the manufacturing cost can be reduced.

Although the present invention has been described in terms of preferred embodiments thereof, it is obvious to a person skilled in the art that various alterations and modifications are possible without departing from the scope of the present invention which is set forth in the appended claims. For instance, a reference pressure value may be defined for the purpose of controlling the lower limit of the prescribed range of the pressure in the accumulator, instead of controlling the upper limit of the prescribed range of the pressure in the accumulator. In this case, the control unit activates the pump after elapsing of a certain time period following a time point when said accumulator inner pressure as detected by the pressure sensor has dropped below the reference pressure value, and the time period is likewise changed with a change in the vehicle speed.

What we claim is:

1. A pressure supply system for on-board equipment of a vehicle, comprising:
    a pump actuated by power drive means;
    an output conduit connected to an output end of said pump;
    an accumulator connected to said conduit;
    a pressure sensor for detecting an inner pressure of said accumulator;
    a speed sensor for detecting a traveling speed of said vehicle; and
    a control unit for controlling operation of said pump according to an output of said pressure means so as to maintain the inner pressure of said accumulator as detected by said pressure sensor within a prescribed range, the range being made higher as the vehicle speed as detected by said speed sensor is increased.

2. A pressure supply system according to claim 1, wherein said control unit includes memory means for defining an upper limit pressure value and a lower limit pressure value, said control unit activating said pump when the inner pressure of said accumulator detected by said pressure sensor has reached the lower limit pressure value and deactivating said pump when the inner pressure detected by said pressure sensor has reached the upper limit pressure value;
    at least one of the upper and lower limit pressure values being made higher as the vehicle speed as detected by said speed sensor is increased.

3. A pressure supply system according to claim 1, wherein said control unit includes means for controlling said pump so as to maintain the inner pressure of said accumulator above a predetermined minimum pressure and memory means for defining a reference pressure value associated with the predetermined minimum pressure, said control unit activating said pump when inner pressure detected by said pressure sensor has dropped below the reference pressure value, and deactivating said pump after elapsing of a certain time period following such an activation of said pump,
    said time period being increased as the vehicle speed is increased.

4. A pressure supply system for on-board equipment of a vehicle, comprising:
    a pump actuated by power drive means;
    an output conduit connected to an output end of said pump;
    an accumulator connected to said conduit;
    a pressure sensor for detecting an inner pressure of said accumulator;
    a speed sensor for detecting a travelling speed of said vehicle; and
    a control unit for controlling operation of said pump according to an output of said pressure sensor so as to maintain the inner pressure of said accumulator as detected by said pressure sensor within a prescribed range, said control unit including memory means for defining an upper limit pressure value and a lower limit pressure value,
    said control unit activating said pump when the inner pressure detected by said pressure sensor has reached the lower limit pressure value and deactivating said pump when the inner pressure detected by said pressure sensor has reached the upper limit pressure value,
    at least one of the upper and lower limit pressure values being made higher as the vehicle speed detected by said speed sensor is increased.

5. A pressure supply system according to claim 4, wherein at least one of the upper and lower limit pressure values is made higher as the vehicle speed is increased such that each of the limit pressure values is substantially constant at a first level when the vehicle speed is lower than a first vehicle speed, is substantially constant at a second level higher than the first level when the vehicle speed is higher than a second vehicle speed which is higher than the first vehicle speed, and is progressively increased between the first and second levels when the vehicle speed is increased between the first and second vehicle speeds.

6. A pressure supply system for on-board equipment of a vehicle comprising;

a pump actuated by power drive means;

an output conduit connected to an output end of said pump;

an accumulator connected to said conduit;

a pressure sensor for detecting an inner pressure of said accumulator;

a speed sensor for detecting a travelling speed of said vehicle; and a control unit for controlling operation of said pump according to an output of said pressure sensor so as to maintain the inner pressure of said accumulator as detected by said pressure sensor above a predetermined minimum pressure, said control unit including memory means for defining a reference pressure value for the minimum pressure, said control unit activating said pump when the inner pressure detected by said pressure sensor has dropped below the reference pressure value, and deactivating said pump after elapsing of a predetermined time period following such an activation of said pump.

7. A method for controlling a pressure supply system for on-board equipment of a vehicle wherein the pressure supply system incorporates a pump actuated by power drive means, an output conduit connected to an output end of the pump, an accumulator connected to the conduit, a pressure sensor for detecting an inner pressure of the accumulator, a speed sensor for detecting a travelling speed of the vehicle, and a control unit for controlling operation of the pump, the method comprising the steps of:

detecting an inner pressure of the accumulator;

detecting a vehicle speed;

defining and storing an upper limit pressure value and a lower limit pressure value in the control unit based on the detected vehicle speed;

comparing the detected inner pressure of the accumulator with the upper and lower limit pressure values;

activating the pump when the detected inner pressure has reached the lower limit pressure value;

deactivating the pump when the detected inner pressure has reached the upper limit pressure value; and adjusting at least one of the upper and lower limit pressure values as the vehicle speed is increased.

8. A method for controlling a pressure supply system according to claim 7, wherein said step of adjusting at least one of the upper and lower limit pressure values as the vehicle speed is increased includes the steps of defining a first and second level for each of the upper and lower limit pressure values, maintaining each of the upper and lower limit pressure values substantially constant at a corresponding first level when the vehicle speed is lower than a first vehicle speed, maintaining each of the upper and lower limit pressure values substantially constant at a corresponding second level higher than the corresponding first level when the vehicle speed is higher than a second vehicle speed which is higher than the first vehicle speed, and progressively increasing each of the upper and lower limit pressure values between the corresponding first and second levels when the vehicle speed is increased between the first and second vehicle speeds.

9. A method for controlling a pressure supply system for on-board equipment of a vehicle wherein the pressure supply system incorporates a pump actuated by power drive means, an output conduit connected to an output end of the pump, an accumulator connected to the conduit, a pressure sensor for detecting an inner pressure of the accumulator, a speed sensor for detecting a travelling speed of the vehicle, and a control unit for controlling operation of the pump, the method comprising the steps of:

detecting an inner pressure of the accumulator;

detecting a vehicle speed;

defining and storing a reference pressure value for a predetermined minimum pressure in the control unit;

comparing the detected inner pressure of the accumulator with the reference pressure value;

activating the pump when the detected inner pressure has dropped below the reference pressure value;

deactivating the pump after elapsing of a predetermined time period following such an activation of the pump; and maintaining the inner pressure of the accumulator above the predetermined minimum pressure based on an output of the pressure sensor.

* * * * *